Nov. 17, 1936.  W. F. MUEHL  2,061,287
AUTOMATIC PIPE WELDING MACHINE
Filed Oct. 31, 1930  4 Sheets—Sheet 1
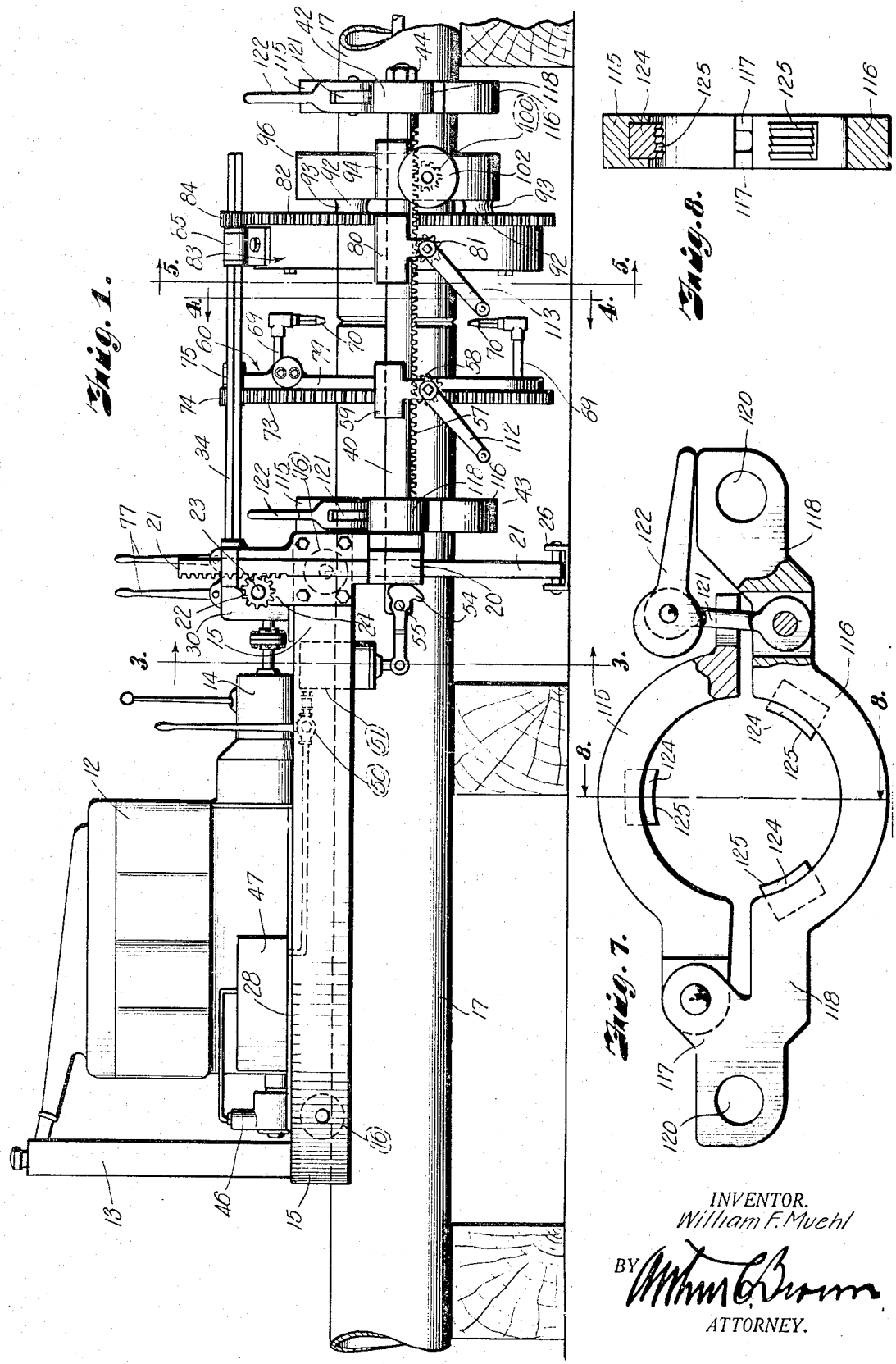
INVENTOR.
William F. Muehl
BY Arthur C. Brown
ATTORNEY.

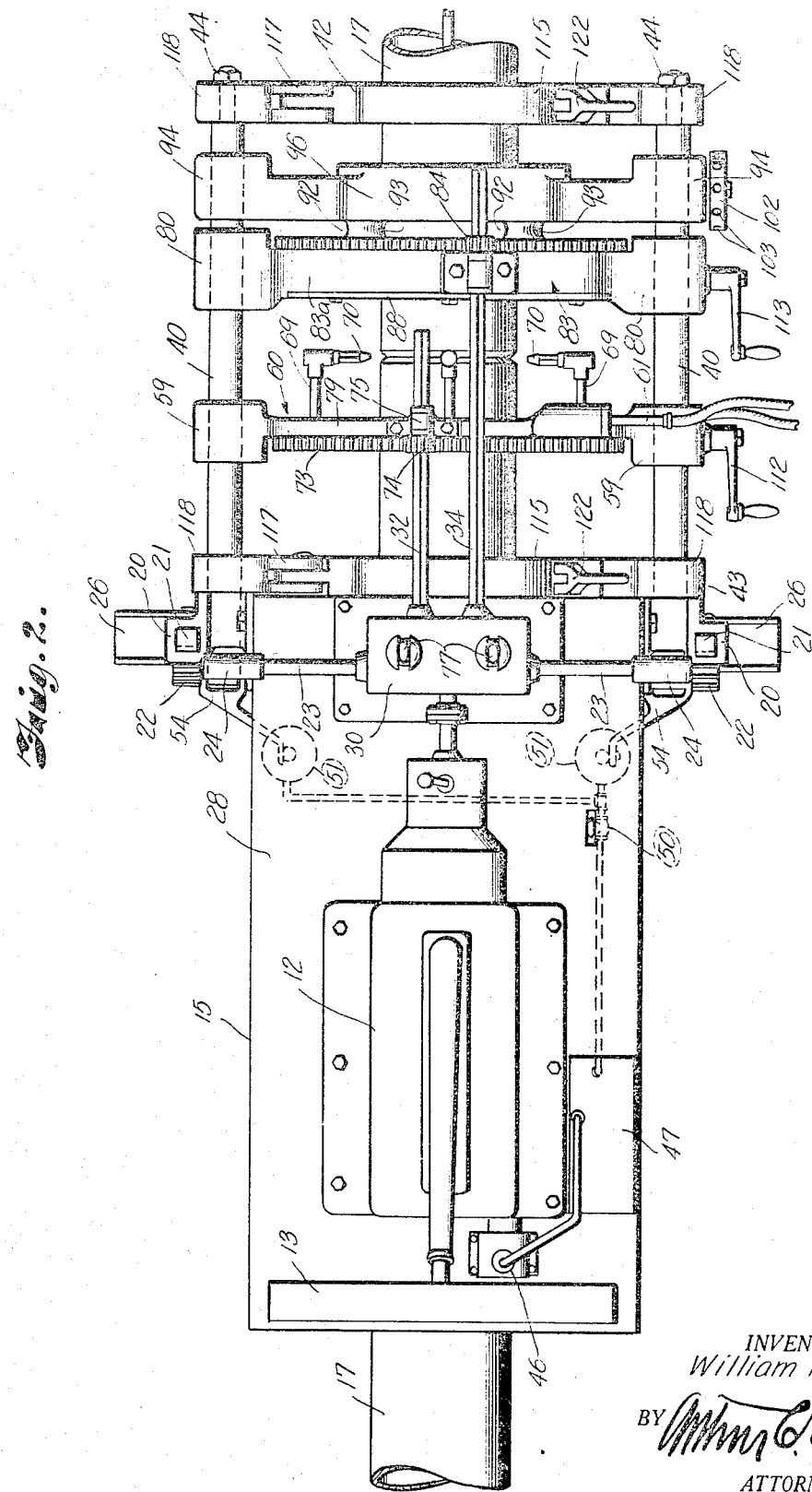

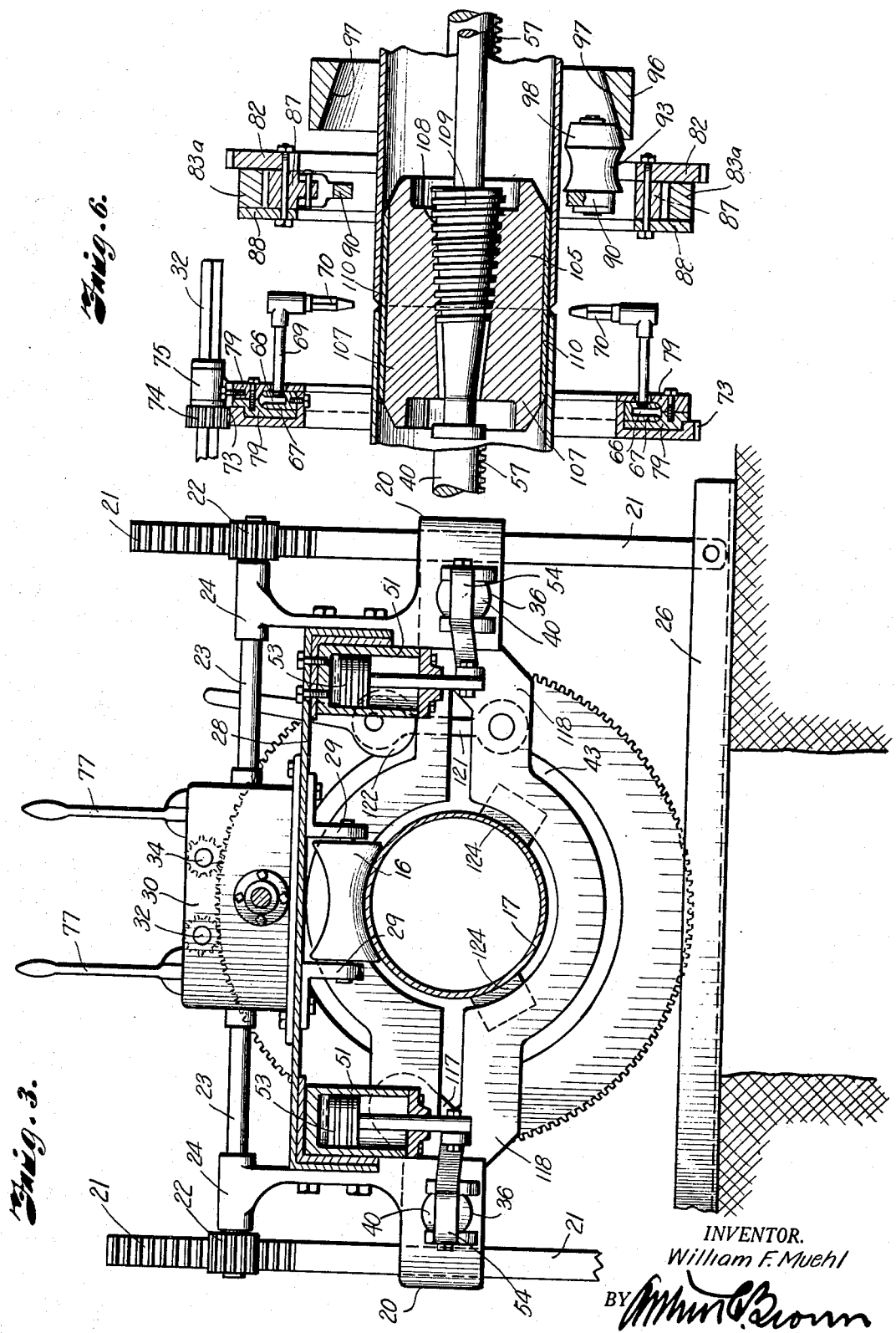

Nov. 17, 1936.  W. F. MUEHL  2,061,287
AUTOMATIC PIPE WELDING MACHINE
Filed Oct. 31, 1930    4 Sheets—Sheet 4
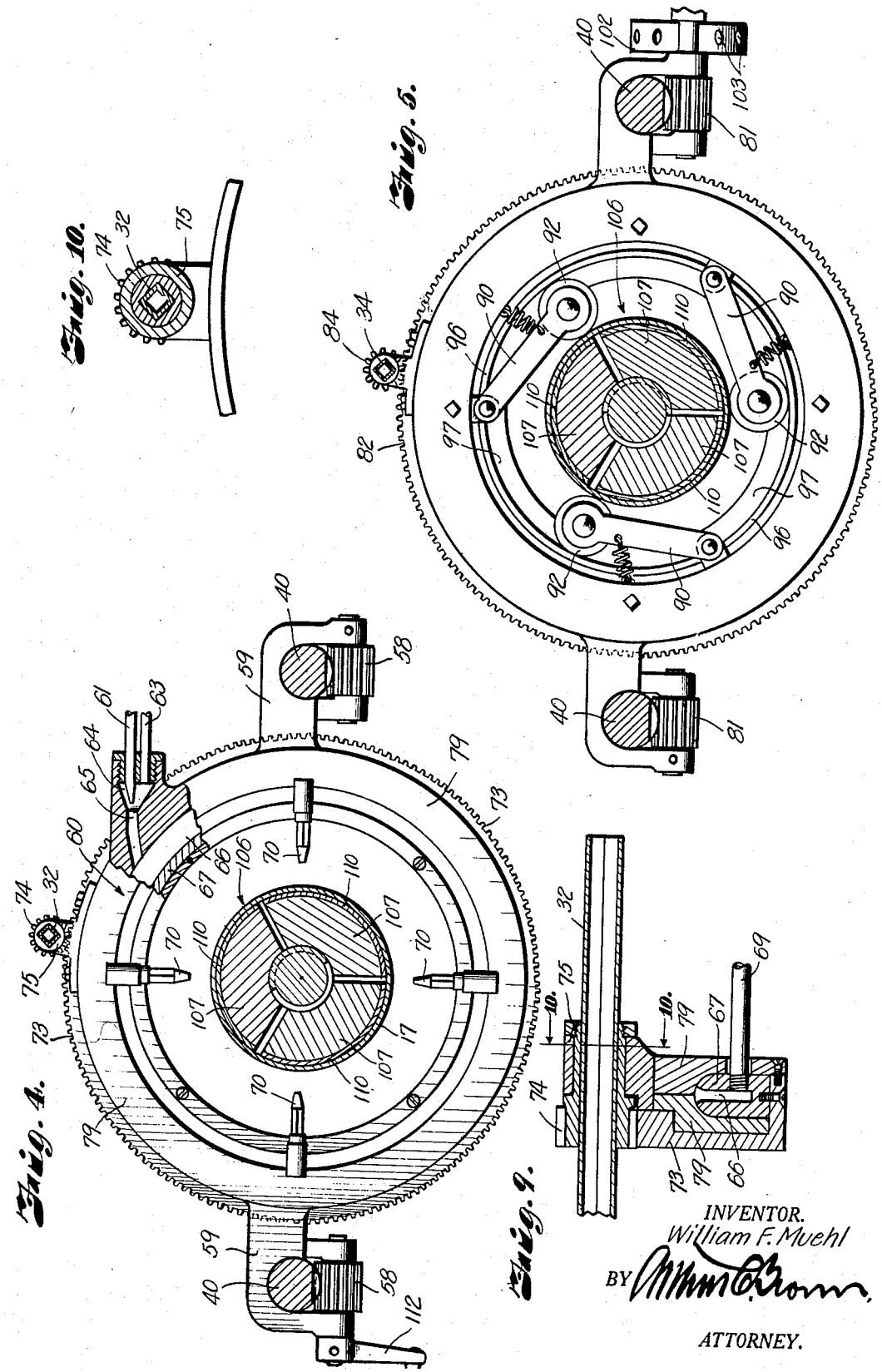
INVENTOR.
William F. Muehl
BY
ATTORNEY.

Patented Nov. 17, 1936

2,061,287

UNITED STATES PATENT OFFICE 2,061,287

AUTOMATIC PIPE WELDING MACHINE

William F. Muehl, Kansas City, Mo.

Application October 31, 1930, Serial No. 492,421

8 Claims. (Cl. 78—85)

This invention relates to welding machines, and more particularly to a welding machine adapted to weld the circumferential joints of pipes together, in place.

It is an object of this invention to produce a machine which will travel along the pipe and weld the joints of adjacent pieces of pipe together and forge them into shape.

In terms of broad inclusion, the invention comprehends having means to draw the adjacent pipe sections together and having a set of rotatable welding tips for heating the pipe adjacent the ends thereof, and a set of power-actuated rollers for forging the pipe and restoring the original fibrous structure of the metal.

The particular apparatus deemed best suited for accomplishing these and other results is shown in the accompanying drawings, in which:

Fig. 1 is a vertical elevational view showing the machine in place on a pipe.

Fig. 2 is a plan view of the machine.

Fig. 3 is a cross section on the line 3—3 of Fig. 1, looking in the direction of the arrows.

Fig. 4 is a view on the line 4—4 of Fig. 1, looking in the direction of the arrows.

Fig. 5 is a detail of the rollers showing the mounting thereof on the spacing bars and the actuating means, being a section taken on the line 5—5 of Fig. 1.

Fig. 6 is a detail showing the construction of the tips.

Fig. 7 is a detail view of the gripping collars showing the gripping jaws in place.

Fig. 8 is a cross section on the line 8—8 of Fig. 7, looking in the direction of the arrows.

Fig. 9 is a detail of a single welding tip.

Fig. 10 is a cross sectional view showing the bearing and driving sprocket for driving the welding tips.

In the drawings, in which like numerals indicate like parts throughout the several views, a gasoline engine is shown at 12 having a radiator 13 and a transmission 14 adapted to roll on the top of the pipe 17 to be welded. The engine, radiator and transmission are mounted on the base 15 which in turn is mounted on spool-like rollers 16. The curvatures of the rollers 16 are made to conform to the pipe 17.

The base 15 has a pair of ears 20 at the forward end of the machine having holes therethrough to guide the rack bars 21 which mesh at the upper end with pinions 22. The pinions are run on the shaft 23 and supported in the bearings 24 which in turn are preferably formed integrally with the base 15. The lower part of the rack bars 21 are attached to a cross beam 26 which spans the ditch and acts as a rigid support to prevent the machine from overturning or falling off the pipe during the welding operation.

Attached to the members which support the bearings 24 is a second base 28 in spaced parallel relation with the first base and overlying the pipe having brackets 29 thereon to carry the rollers 16. On top of the plate is mounted a second gear and clutch box 30 carrying reducing gears and clutches to operate both the shafts 23 and the shafts 32 and 34 for controlling the rotation of the welding tips and the forging rollers.

The ears 20 have a second set of ports therethrough labelled 36 in Fig. 3, which accommodate pull-up bars 40. At the outer end of the bars 40 there is connected a clamp 42 as shown in Fig. 1, a detail of which clamp is shown in Fig. 7. A second clamp similar to 42 is shown at 43. Nuts or other securing means 44 are attached onto the end of the draw bars and hold the clamp 42 integral therewith.

Referring to Fig. 7, the clamps 42 and 43 comprise an upper semi-circular member 115 and a corresponding lower member 116. The lower clamping member 116 has a pair of arms 118 extending outwardly therefrom and having holes 120 therethrough to accommodate the pull-up rods 40. One of said arms 118 is formed with a lug 117 to which the upper clamping member is pivotally connected. The other arm 118 is formed with a port therethrough which pivotally retains the link 121. The link 121 carries at its upper end the cam member 122 which is adapted to secure the upper clamp member to the pipe. The gripping jaws 124 are inset into the clamping members 115 and 116 in such a manner that the serrations 125 have their vertical portions facing away from the joint.

To operate the pull-up bars, it is proposed to have a pump 46 pumping liquid into an accumulator 47 from whence it passes through a valve 50 into the cylinders 51 to operate the hydraulic press, forcing the pistons 53 in the cylinders down and operating the cam members 54 which are pivoted at 55.

In operation the two clamps 42 and 43 are set with the pipe drawn up tight and are kept in fully drawn up position by means of the hydraulic press 51 and the cam 54. It will be noted at this point that whereas the clamp 42 is securely attached to the pull-up rod 40 that the clamp 43 is loosely mounted thereon so that the rod 40 may slide therethrough.

The lower side of the pull-up rod 40 is geared to form a rack, as shown at 57, and has mounted thereon a travelling pinion 58 which is journalled in a travelling housing 59 running along the two pull-up bars. The housing 59 is attached to the ring member carrying the welding tips and generally designated at 60. The details of the ring member are better shown in Figs. 4, 6 and 9. The details of the travelling housing 59 and the ring 60 are shown in Fig. 4.

Oxygen is admitted through the pipe 61 while acetylene or other suitable welding gas is admitted through the pipe 63 which merges into the Venturi orifice 64, entraining with it oxygen from the pipe 61. The mixture flows through the mixing chamber 65 and into the hollow portion 66 of the ring 67, as shown best in Fig. 9. It has been found that the ring 67 functions most satisfactorily when made of bronze.

The ring 67 carries pipes 69 which in turn carry the welding tips 70 at the outer ends thereof. The ring 67 is fastened onto the ring gear 73 which in turn meshes with the gear 74 carried on the sleeve 75. The sleeve 75 is slidably mounted on the power shaft 32. Any well known means may be used to transmit power from the sleeve 75 to the power shaft 32. As herein shown, the power shaft 32 is rectangular in cross section to correspond with the interior rectangular cross section of the sleeve 75. However, other well known means may be used to accomplish this result, for example, keying the ring 67 onto the shaft 32. The shaft 32 is run through the gear box 30 and the operation thereof is controlled by some such means as a clutch lever 77.

It will be noted from Fig. 9 that the ring 60 has both a stationary and a rotary portion, the stationary portion being designated as 79 and being integrally connected with the sleeve 75.

A second travelling housing 80 is mounted on the pull-up bars 40 carrying thereon a spur gear 81 for moving the casing or roller carrier which may be generally designated as 83. The casing or roller carrier 83 is composed of two parts, one being stationary and shown in Fig. 6 as 83a, while the other is attached to the spur gear 82 and rotates, being driven from the intermeshing gear 84 shown in Figs. 1 and 5.

The gear 84 is driven from a shaft 34 similar to shaft 32, there being means to transmit the power from the shaft 34 to the gear 84 and still permit the sleeve member 85 carrying the gear 84 to slide longitudinally on said shaft 34.

The spur gear 82 has attached thereto an inner ring member 87 and a retaining ring 88. Pivoted onto the inner edge of the ring 87 are arms 90 carrying rollers 92. The rollers, best shown in Fig. 6, are composed of a slightly concave portion 93 and a conical tapered portion 98 that are pivoted onto the arms 90, being free to rotate thereon.

Mounted on the pull-up bar 40 is a collar 94 carrying a sleeve 96. The sleeve 96 is non-rotatable about the pipe 17 and has an inner conical face 97 adapted to contact with the conical portion 98 of the roller.

In mesh with the rack gear 57 and attached to the collar 94 is a pinion 100. The pinion 100 is operated through a spool 102 having holes 103 therein into which a bar may be inserted to force the sleeve 96 over the conical portion 98 of the rollers to force the rollers inwardly.

In order to support the pipe so that it may be forged, there is provided an expansible member or mandrel designated in Fig. 6 as 105, and shown in detail in Figs. 4 and 5. The mandrel aids in supporting the pipes in alignment during the welding operation and prevents the fused metal from forming a bead or inset on the inside of the pipe, and thus gives a smooth finish and uniform diameter to the interior of the pipe. The expander comprises preferably three or more segmental sections 107 having a conical thread 108 and a conical screw 109, as best shown in Fig. 6. The expanders are made preferably of steel or other suitable material, and are lined at 110 with a different product such as tungsten carbide alloy having a higher melting point than that of the material to be welded, and likewise having a lower coefficient of friction than that of the steel. These points are essential in the construction of the device, since a material having a low melting point or a low fusing point would become heated beyond the said fusing point in welding the pipes together and be fused onto the pipes.

It is likewise essential that a low coefficient of friction be obtained since there must be considerable pressure exerted radially by the thread and screw 108—109 in order to form a sufficient support for the pipe when being forged by the rollers 93, and if the coefficient of friction between the lining metal 110 and the pipe is not low it will require an excessive force by the cam 54 to bring the two sections of pipe together and weld them. The lining of tungsten carbide alloy or other suitable material need not be excessively thick, and it has been found that usually about one-eighth inch will suffice for the purpose.

In operation the machine is shifted into the desired position by means of any suitable arrangement such as a winch, or, if desired, the wheels 16 may be geared to run directly off the motor 12. When arriving in position the two pieces of pipe to be welded are brought into abutting relation and the clamps 43 and 42 are attached to the two pipes 17 to be welded. The said pipe 17 is finished with wedge ends so as to form a V-abutment to facilitate the welding operation.

The rack bars 21 are then lowered until the cross beam 26 contacts with the surface of the ground and are stopped in this position to form a secure brace to prevent the machine from tipping over under the force of succeeding operations.

The engine is then put in operation, together with the pump 46, which proceeds to build up pressure in the accumulator 47. The valve 50 is opened by means of the operating lever attached thereto to emit pressure into the cylinder 51 and actuate the cam 54 which draws the sections together.

The welding tips are then ignited and the shaft 32 is connected to the engine to rotate the tips and heat the metal in the vicinity of the joint.

The hand crank 112 connected to the spur 58 is adapted to move the welding tips back and forth longitudinally on the pipe so that the desired metal in the vicinity of the joint will be heated. When the material in the vicinity of the joint has attained the proper temperature, the welding tips are turned off and moved back towards the engine out of operative position, and the power disengaged from the shaft 34.

The roller carrier 83 is then moved so that the rollers 93 are over the joint. The constant pressure tending to pull the joint together, due to action of the cams 54, crushes the fused metal together. The metal thus crushed together by the pressure of the cams 54 is necessarily forced up, forming a solid bead or upset portion surrounding the exterior of the joint of pipe.

The roller carrier 83 is moved opposite the joint and over the formed bead by means of the crank 113 which is keyed onto the spur gear 81. Power is then applied to the shaft 34 and the rollers 92 rotated about the joint. The sleeve 96 is then brought up so that the conical portion 97 thereof comes over the corresponding conical portion 98 of the roller and contacts it against the pipe.

By inserting a crow bar into the holes 103 of the spool 102, pressure may be applied to force the said rollers down onto the pipe and apply the necessary pressure and working to restore the iron to its original consistency. This process gives a smooth inside joint, due to the form 105, with but a slight bulge on the outside of the pipe given by the rollers 93. The bulge on the outside is necessary to make up the slightly additional strength lost in making the weld.

After the weld is made, the conical spool 109 is loosened in the threads 108, and the expansible member 105 may then be moved along to the next pipe section. The rack bars 21 are then drawn up to lift the cross beam 26 off the ground and the machine may then be moved to the next joint.

It is realized that this invention is susceptible to many changes in modifications, and it is, therefore, not desired to limit it to the precise apparatus or method herein disclosed, but only by the scope of the appended claims.

What is claimed as new and desired to secure by Letters Patent is:

1. In a welding machine, a frame, means mounted on said frame to heat the members to be welded, a forging ring mounted on said frame including a plurality of rollers rotatably mounted on said ring, and means to rotate the forging ring to revolve said rollers about a common axis to work said welded material.

2. In a machine for welding the circumferential joint between pipe sections including a frame, means rotatable on said frame for heating said joint, means within said pipe forming a support therefor in a radial direction, rollers mounted on said frame, means to rotate said rollers about the axis of said pipe, and means to exert pressure on said rollers in a longitudinal direction to work the material composing the pipe sections at said joint.

3. In a machine for welding abutting sections of pipe, a frame having the greater portion thereof adapted for mounting on the top side of the pipe sections and including rollers operable on the pipe sections to support the frame for rolling movement therealong, means on the frame adapted for downward extension to engage a fixed support for laterally bracing and stabilizing the frame on a pipe section, means for anchoring the frame against rolling movement on one of the pipe sections, a clamp movable with relation to the frame to clamp an adjoining pipe section and fluid pressure actuated means on the frame for drawing the movable clamp toward the frame to bring the pipe sections into abutting alignment.

4. A machine for welding abutting sections of pipe including a frame means for mounting the frame on the pipe sections, a pipe clamping member fixed to the frame for anchoring the frame to one of the pipe sections, spaced pull-up arms, means for supporting the pull-up arms for longitudinal movement on the frame relatively to the pipe sections, a clamp carried by said pull-up arms for engaging the abutting pipe section, fluid pressure actuated means on the frame, means operably connecting the fluid pressure actuated means with the pull-up arms to pull the pipe sections together, and means supported on the arms for welding the pipe sections together.

5. A machine for welding the joint between abutting sections of pipe including a frame, rollers supporting the frame for travel longitudinally on the pipe sections, a motor on the frame, a pair of shafts rotatably supported on the frame, means operably connecting the motor with the shafts, a pipe clamping member fixed to the frame for anchoring the frame against rolling movement on the pipe sections, spaced arms slidable with relation to the frame and extending longitudinally of the pipe sections, a clamp carried by said arms for engaging an abutting pipe section, fluid pressure actuated means on the frame and operably connected with the arms to pull the pipe sections together, a fire ring supported on said arms, a forging ring supported by the arms adjacent the fire ring, means for selectively and successively moving first the fire ring and then the forging ring into position to act on the joint in forming a weld, and means operably connecting the fire ring and the forging ring with said shafts to rotate said rings.

6. In a welding machine arranged for travelling along a pipe line progressively with the construction of said pipe line comprising a frame, means mounting the frame for rolling support on the pipe line, a clamp member fixed to the frame and encircling the pipe line to anchor the frame against rolling movement on the pipe line, a second clamp member for clamping a pipe section to be welded to the end of the line, a pair of pull up arms fixed to the last named clamp member, means for slidably mounting the pull up arms on the frame, an actuator on the frame, means connecting the actuator with the pull up arms to slide the pull up arms in the direction of the frame for drawing said pipe section into engagement with the pipe line, and heating means supported upon said pull up arms for heating the joint between the pipe section and the line to welding temperature simultaneously with the actuation of said actuator.

7. In a welding machine arranged for travelling along a pipe line progressively with the construction of said pipe line, comprising a frame, means mounting the frame for rolling support on the pipe line, a clamp member fixed to the frame and encircling the pipe line to anchor the frame against rolling movement on the pipe line, a second clamp member for clamping a pipe section to be welded to the end of the line, a pair of pull up arms fixed to the last named clamp member, means for slidably mounting the pull up arms on the frame, an actuator on the frame, means connecting the actuator with the pull up arms to slide the pull up arms in the direction of the frame for drawing said pipe section into engagement with the pipe line, and rack bars slidable in the frame at opposite sides of the pipe line for engaging a supporting surface to prevent rotation of the frame on the pipe line.

8. In a welding machine arranged for travelling along a pipe line progressively with the construction of said pipe line comprising a frame, means mounting the frame for rolling support on the pipe line, means mounted on the frame to heat a joint between the pipe line and a pipe section to be welded thereto, and means mounted on the frame for forging the joint including a ring, a plurality of rollers rotatably carried by said ring, and means to rotate the forging ring to revolve said rollers about the axis of the pipe to work the metal of said joint.

WILLIAM F. MUEHL.